United States Patent
Hyams et al.

(10) Patent No.: US 7,415,029 B1
(45) Date of Patent: Aug. 19, 2008

(54) PROGRAMMABLE FSM ENGINE USING A NEW CAS APPLICATION LANGUAGE

(75) Inventors: Kenneth Michael Hyams, Santa Barbara, CA (US); Robert James Biskner, Santa Barbara, CA (US); Ronak Desai, Fremont, CA (US); Satish Salagame, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 09/746,467

(22) Filed: Dec. 22, 2000

(51) Int. Cl.
*H04L 12/64* (2006.01)
*H04M 7/00* (2006.01)

(52) U.S. Cl. .................. 370/401; 370/356; 370/467; 379/229; 379/237

(58) Field of Classification Search .......... 370/260, 370/352, 353, 356, 389–401, 442, 465–467, 370/498; 379/90.01, 93.33, 158, 265, 265.02, 379/229, 237; 709/227–231, 249
See application file for complete search history.

(56) References Cited

U.S. PATENT DOCUMENTS

| | | | |
|---|---|---|---|
| 5,600,633 A | 2/1997 | Jaisingh et al. | |
| 5,729,536 A | 3/1998 | Doshi et al. | |
| 5,761,286 A | 6/1998 | Das et al. | |
| 5,774,689 A | 6/1998 | Curtis et al. | |
| 5,889,816 A | 3/1999 | Agrawal et al. | |
| 5,970,062 A | 10/1999 | Bauchot | |
| 6,009,096 A | 12/1999 | Jaisingh et al. | |
| 6,018,521 A | 1/2000 | Timbs et al. | |
| 6,028,933 A | 2/2000 | Heer et al. | |
| 6,031,904 A | 2/2000 | An et al. | |
| 6,075,942 A * | 6/2000 | Cartwright, Jr. | 717/138 |
| 6,101,252 A | 8/2000 | Cardillo, IV et al. | |
| 6,151,390 A * | 11/2000 | Volftsun et al. | 379/229 |
| 6,216,000 B1 | 4/2001 | Blumhardt | |
| 6,272,334 B1 | 8/2001 | Rao | |
| 6,363,065 B1 * | 3/2002 | Thornton et al. | 370/352 |
| 6,407,997 B1 | 6/2002 | DeNap et al. | |
| 6,411,705 B2 * | 6/2002 | Oran et al. | 379/230 |
| 6,434,229 B1 | 8/2002 | Bradd et al. | |
| 6,560,327 B1 | 5/2003 | McConnell | |
| 6,570,869 B1 * | 5/2003 | Shankar et al. | 370/352 |
| 6,574,470 B1 | 6/2003 | Chow et al. | |
| 6,614,781 B1 * | 9/2003 | Elliott et al. | 370/352 |
| 6,622,016 B1 | 9/2003 | Sladek et al. | |
| 6,711,417 B1 | 3/2004 | Gorman et al. | |
| 6,728,239 B1 * | 4/2004 | Kung et al. | 370/352 |
| 6,751,236 B1 | 6/2004 | Groenendaal | |
| 6,853,637 B1 * | 2/2005 | Norrell et al. | 370/352 |

(Continued)

OTHER PUBLICATIONS

Newton's Telecom Dictionary, Mar. 2003, CMP Books, 19th Edition, pp. 637.*
Maruicio Arango and Christian Huitema, "Simple Gateway Control Protocol (SGCP)," Internet Engineering Task Force, Internet Draft, Version 1.1, 96 pgs. (Jul. 30, 1998).

(Continued)

*Primary Examiner*—Chi Pham
*Assistant Examiner*—Ahmed Elallam
(74) *Attorney, Agent, or Firm*—Blakely, Sokoloff, Taylor & Zafman LLP

(57) ABSTRACT

An apparatus including a private branch exchange (PBX) switch, a residential gateway to receive channel associated signals (CAS) from the PBX switch, and a programmable CAS module to convert the CAS signals into internet protocol (IP) signals is disclosed.

20 Claims, 4 Drawing Sheets

U.S. PATENT DOCUMENTS

| | | | | |
|---|---|---|---|---|
| 6,940,959 B1* | 9/2005 | Eyre et al. | ............ | 379/142.06 |
| 6,967,956 B1* | 11/2005 | Tinsley et al. | ............... | 370/466 |
| 7,039,175 B1* | 5/2006 | Foltak et al. | ................ | 379/229 |
| 7,068,668 B2* | 6/2006 | Feuer | ........................ | 370/401 |
| 7,239,629 B1* | 7/2007 | Olshansky et al. | .......... | 370/353 |
| 2002/0006137 A1* | 1/2002 | Rabenko et al. | ............ | 370/466 |
| 2003/0128698 A1* | 7/2003 | Darland et al. | ............. | 370/360 |

OTHER PUBLICATIONS

Session $V_b$: *Work-in-Progress 2*, Joe Sventek, Hewlett-Packard, 47 pgs. (1999).

Bellcore, "Service Manager (SM) 1.0: ISUP Interface", BD-ISUP-INT-1, Issue 1.1, Jan. 1999, pp. 1-210.

IS-41 Revision C Explained, "Basic Intersystem Handoff Functions", pp. 135-160 (date prior to Aug. 16, 2000).

\* cited by examiner

PROGRAMMABLE FSM ENGINE USING A NEW CAS APPLICATION LANGUAGE

FIELD OF INVENTION

The present invention is related to the field of voice over internet protocol (VoIP) networks.

BACKGROUND OF THE INVENTION

Conventional networks route telephone signals over an internet protocol (IP) network by converting channel associated signals (CAS) into IP signals using a CAS device. The CAS device serves as a type of gateway between the public branch exchange (PBX) telephone system and the IP network. The CAS device is connected to one or more PBX systems through a line such as a T1 line, for example. The T1 line may connect the CAS device to multiple PBX telephone systems. Each PBX system may have its own specific CAS protocol. However, only one CAS protocol can be used with the line. In order to change the line's CAS protocol, the line must be taken out of service. Alternatively, the CAS module must be able to support a large number of CAS protocols.

It is extremely difficult to support many, if not all, CAS protocols using a single CAS module. Furthermore, if a given protocol is upgraded, the CAS module must be upgraded by taking the corresponding telephone lines out of service.

SUMMARY OF THE INVENTION

An apparatus including a private branch exchange (PBX) switch, a residential gateway to receive channel associated signals (CAS) from the PBX switch, and a programmable CAS module to convert the CAS signals into internet protocol (IP) signals is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A programmable finite state machine to process channel associated signals is disclosed. In one embodiment, the machine includes a private branch exchange (PBX) switch, a residential gateway to receive channel associated signals (CAS) from the PBX switch, and a programmable CAS module to convert the CAS signals into internet protocol (IP) signals.

Using the programmable CAS module, a new CAS protocol can be supported by the programmable module by writing an application program for the new CAS protocol and downloading the new protocol into the programmable CAS module. This eliminates the need for replacing the CAS module with a new module in order to support a different CAS protocol. Furthermore, given that there are innumerable PBX vendors, with different timing requirements for the CAS signals, changing the CAS application program to support a different vendor's timing signals can be done in the field, without having to go through a laborious release process.

Thus, a new CAS variant can be supported by downloading the new CAS variant protocol definition files into the programmable CAS module. The service provider can thus support new CAS variants without needing expensive hardware upgrades. Also, the release cycle is shorter and simpler in order to support a new CAS variant.

Figure 1:
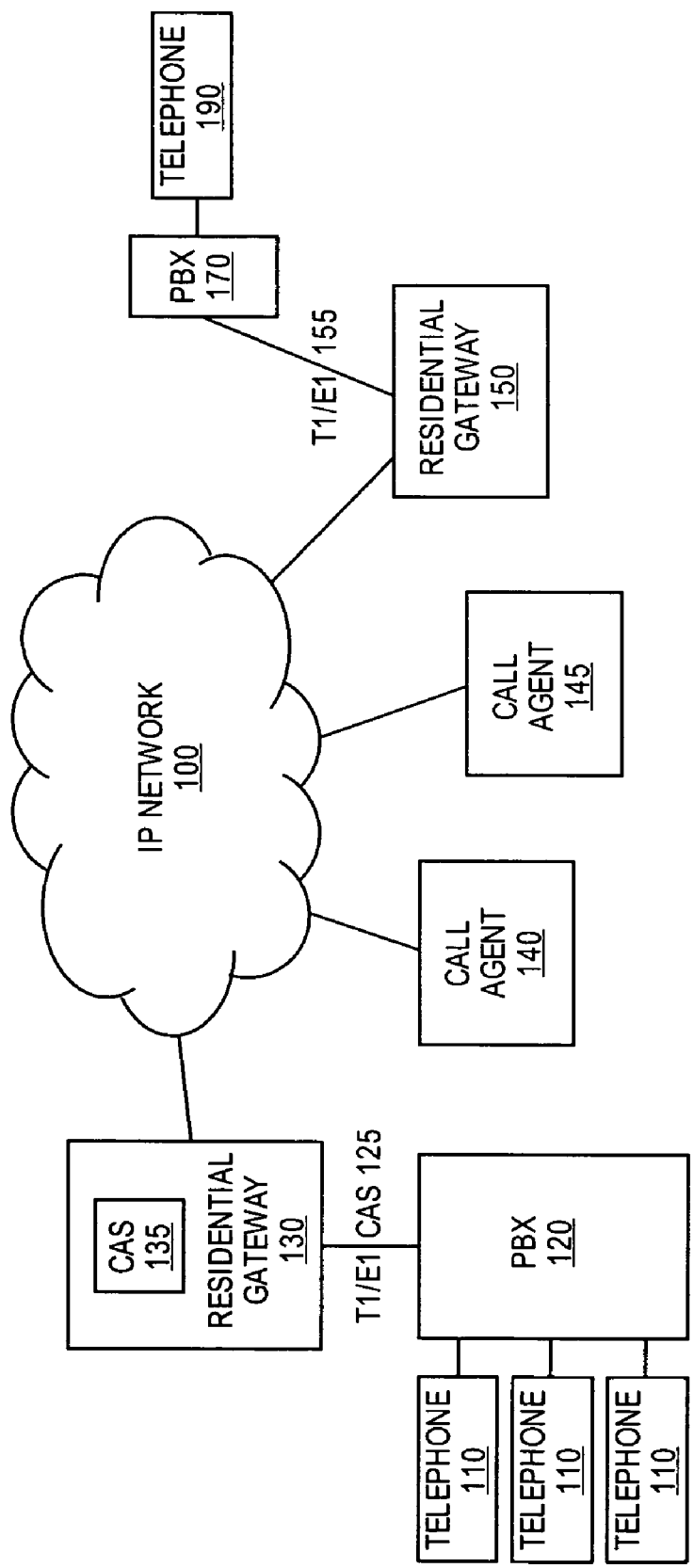
FIG. 1 shows an example of a network that includes a programmable CAS module.

FIG. 1 shows an example of a network that includes a programmable CAS module. As shown in FIG. 1, a telephone call that originates at a given telephone 110 goes through a customer-premises telephony switch, such as a private branch exchange (PBX) 120, and may be routed through a residential gateway (RGW) 130, to enable voice transmission over an internet protocol (IP) network 100. The RGW 130 may engage the telephony 110 with the PBX equipment 120 through channelized T1 or E1 trunks 125. The RGW 130 processes channel associated signaling (CAS) information to identify fundamental circuit states of the telephony equipment to the IP network. For example, with a T1 trunk, the channel associated signaling used to establish and terminate calls, such as on-hook and off-hook signals, may be carried in the channel that will also carry the call data. For an E1 trunk, these CAS signals may be carried in a dedicated channel, while in-band signaling such as dual tone multi-frequency (DTMF) signals may be transmitted in the call channel. The RGW 130 receives these signals and converts them into IP signals, such as xGCP signals for example.

In one embodiment, the RGW converts the CAS signals into IP signals such as gateway control protocol (GCP) signals, for example, using programmable CAS module 135. The GCP signals may be media gateway control protocol (MGCP) signals or simple gateway control protocol (SGCP) signals, for example. The xGCP signals are sent to call agent 140 through IP network 100. Call agent 140 identifies the appropriate telephone that should receive the telephone call that originated at telephone 110, and establishes a connection with the appropriate telephone 190 by sending an appropriate command to call agent 145 and residential gateway 150. Residential gateway 150 converts the xGCP signals back into CAS signals, and sends the CAS signals to the appropriate telephone 190 through PBX 170. The residential gateway 150 may be connected to PBX 170 through a T1 or E1 connection 155.

Figure 2:
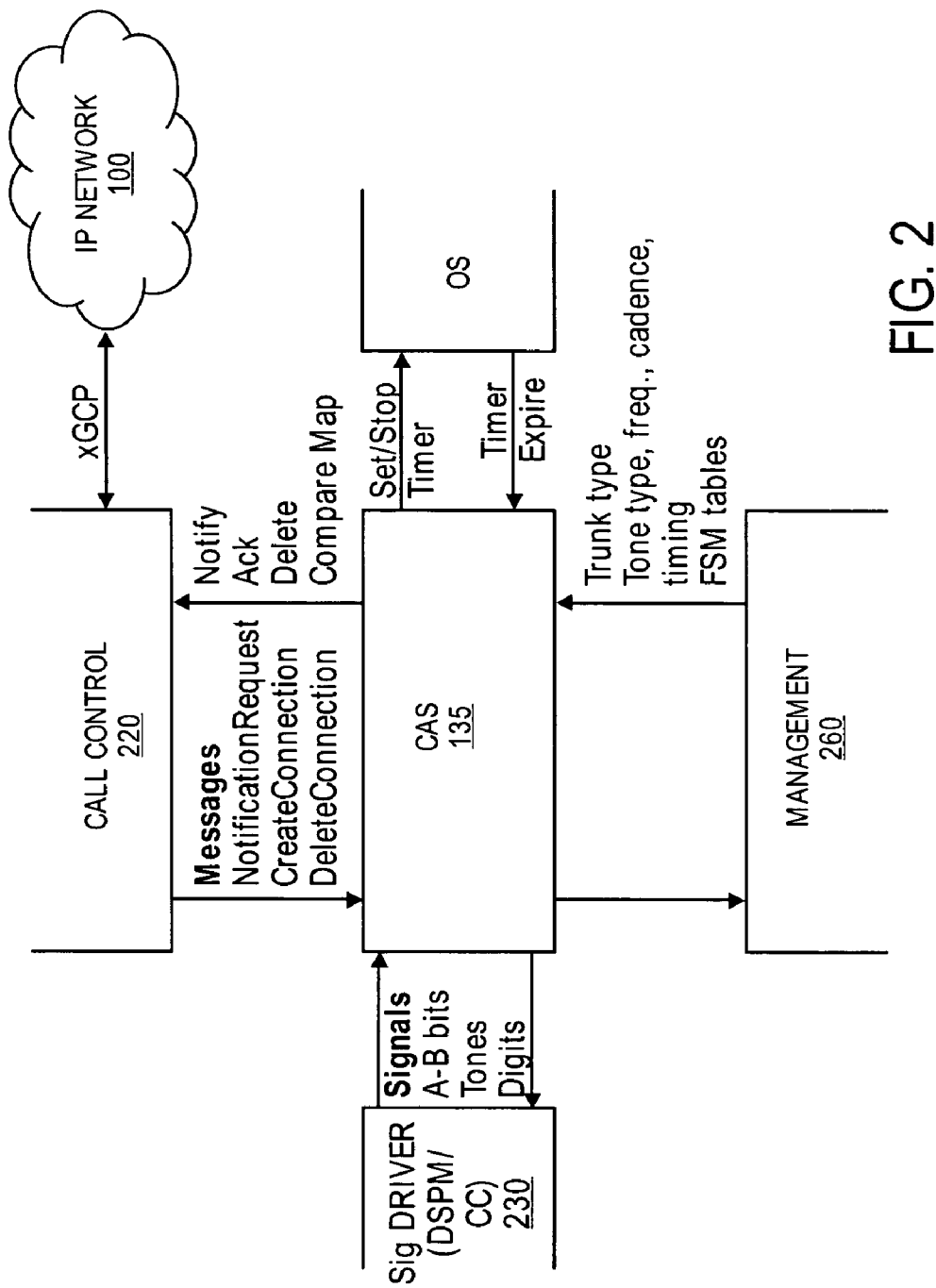
FIG. 2 shows an embodiment of residential gateway that includes programmable CAS module.

FIG. 2 shows an embodiment of residential gateway 130 that includes programmable CAS module 135. The programmable CAS module 135 sends and receives the CAS signals to other components of the RGW. The call control device 220 sends and receives the xGCP messages to and from call agent 140. The call control device decodes and demultiplexes xGCP messages that it receives from the call agent over the IP network and outputs corresponding CAS signals to CAS module 135. The call control device 220 also receives CAS signals, converts them into xGCP, and transmits them to the call agent. This allows for delivery of message components to their appropriate recipient.

The call control device 220 informs the CAS module 135 of simple gateway control protocol (SGCP) notification requests received from the call agent. The notification request may be a standalone message, or may be part of connection oriented messages for the call control device. The CAS module 135 receives indications of signals received from the PBX as well as signals to the PBX through signaling driver subsystem 230. Indications of signals include changes in signaling (A, B, C, D) bits for events such as off-hook, receipt of dial digits, DTMF, MF, and pulse.

The management module 260 may be used to program or define parameters of the CAS module 135. Thus, the CAS module 135 may be a finite state machine (FSM) that is a programmable CAS state machine (PCSM). For example, an octet string upon which a structure is placed to comprise various tables may be loaded into the CAS module by the management subsystem. However, other methods of downloading the application to the CAS engine may be used. This may be obtained by command line interpretation, SNMP or other protocols from remote sources such as the call agent. A table, or data structure, contained in the octet string may define states, events, timing durations, and actions for a PCSM. Other tables may define line signal bits and durations, tone frequencies, cadences and durations, and general parameters related to the connected PBX and specific CAS protocol that influences the behavior of the PCSMs.

The CAS module may be generic to allow support for different CAS protocols. The generic CAS module can handle a specific CAS protocol using programmable state machine files that may be downloaded into the RGW. The downloaded files may contain both the signal definitions as well as the state/event/action data for a given CAS protocol.

Figure 3:
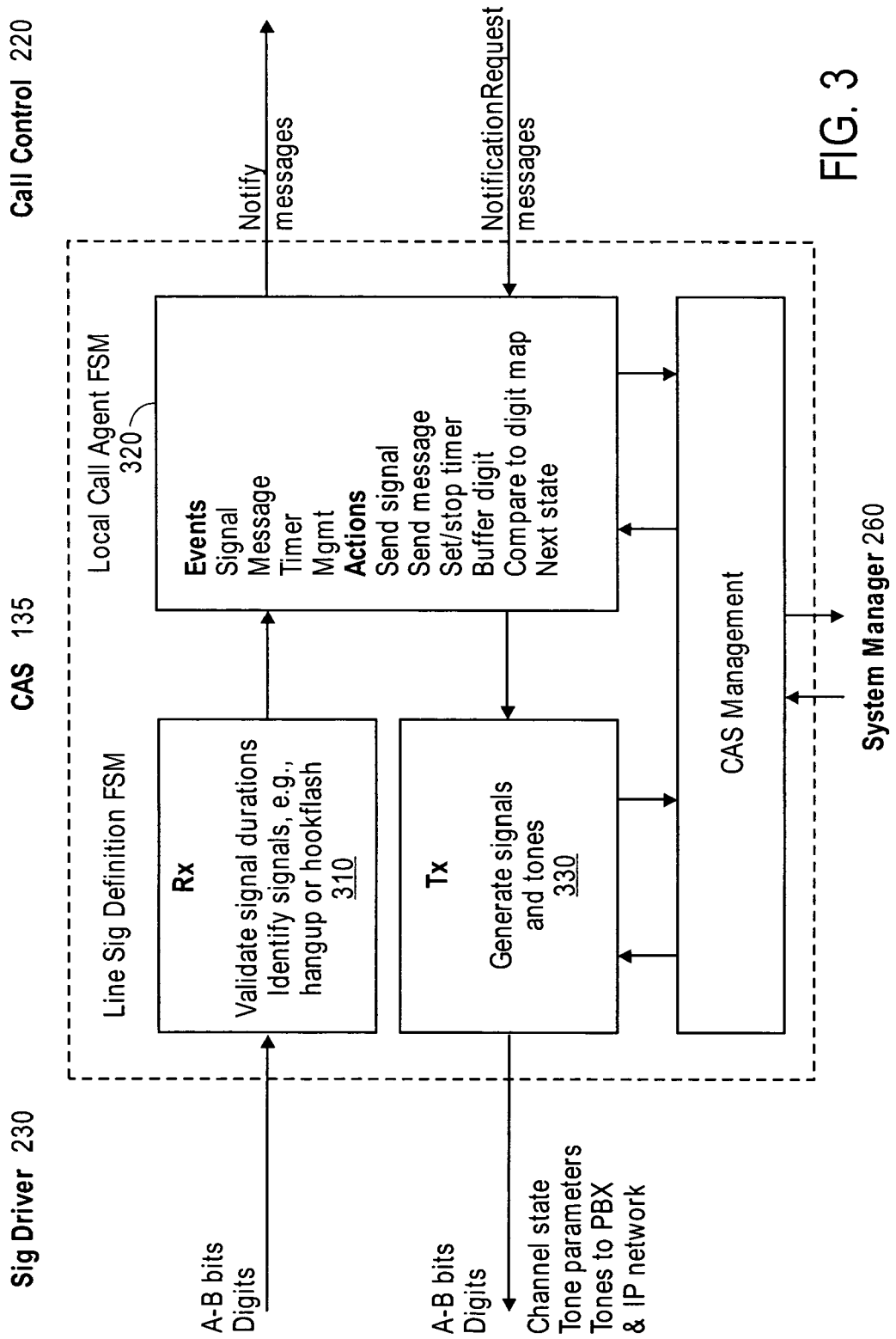
FIG. 3 shows an embodiment of a programmable CAS module.

FIG. 3 shows an embodiment of a programmable CAS module 135. There may be three finite state machines on the RGW host processor that process the CAS information. The local call agent (LCA) FSM 320 interfaces with the call control device to handle CAS event requests from the call agent. The LCA FSM 320 also interfaces with the receive line signal definition (Rx LSD) FSM 310 and the transmit (Tx) LSD FSM 330 to communicate with the PBX. The LCA FSM 320 interprets user defined state/event/action and gives appropriate responses based on the received event for the current state. The LCA FSM may be implemented as a processor which decodes the opcode user-defined actions specified in the CAS file and executes them.

Any CAS events observed on an endpoint are received by the Rx Line Signal Definition (LSD) FSM 310. The Rx LSD FSM 310 informs the LCA 320 about the interpreted event based on the downloaded incoming signal definition. The call agent is then notified of the event through the call control device.

The Rx LSD FSM 310 recognizes changes in the state of line signaling (A, B, C, D bits), as well as inband tones. When a change in signalling bits is recognized, the Rx LSD FSM 310 searches a table for a match to the former state and new state. That table entry then indicates the longest minimum duration for which that pattern constitutes a particular signal.

The Rx LSD FSM 310 sets a timer for that period and waits. If the timer expires, it has seen the signal so it sends an indication to the Local Call Agent FSM 320; it then awaits notification of another signal level change. Should the timer not expire before another signal level change occurs, the Rx LSD FSM 310 checks whether the signal has returned to its original state. If so, this may be a pulse of some known type. Table entries adjacent to the one it had been using may contain the same pattern as seen but with minimum and maximum durations. If one of these matches, it sends an indication to the LCA FSM 320. Finally, if the signal state does not match the original signal state, there was not a pulse.

In its idle state, the Tx LSD FSM 330 waits for a request from the LCA 320 to send a signal out to the PBX. Signals are applied by making a request to the Signaling Driver. For tones or dial pulses there may be parameters found in a table to include in the request. For an A-B bit signals there may be a duration associated which will also be found in a table. The Tx LSD FSM 330 may time the signal, returning the levels to their former state when the timer expires. The Tx LSD FSM 330 returns to the LCA 320 a confirmation that the signal request was completed, or not. If not, it makes a callback later to the LCA indicating completion of the signal request. For A-B bits this may occur when the timer expires for a pulsed signal. For timed tones (such as dial digits, whether tones or pulses) this may occur when a message arrives from the Signaling Driver indicating completion. Thus, the Tx LSD FSM is responsible for transmitting CAS signals to the PBX.

A user may program the portions of the LCA 320 which respond to signals from the Rx LSD FSM 310, timer expirations, and may program messages from the remote call agent and signaling requested therein. Programmable cells for incoming signaling events may have an associated state. There may be many cells for the same state, responding to different events.

Thus, the CAS module can be used with different CAS protocols. The user may provide definitions for incoming and outgoing signals along with the state/event/action data for a given CAS protocol using a user interface tool. The user interface tool may run on a workstation and may create a CAS program file which includes a system section, an incoming signals section, an outgoing signals section, and a state events action section. This CAS program file may be compiled by a CAS compiler to generate a binary CAS file. A given variety of CAS protocol may have a binary CAS file that contains the given protocol specific signal definitions and actions pertaining to the given CAS protocol.

The associated primitives may be provided to the user in order to generate this file. The user interface collects the user data and generates the CAS file. The generated file may be downloaded to the programmable CAS module. Subsequently, a CAS parser program then parses the CAS file and creates data structures corresponding to the signal definitions and state/event/action data. Using the user interface and the primitive functions, the user is thus able to define the CAS information needed by the CAS module for the given CAS protocol.

Figure 4:
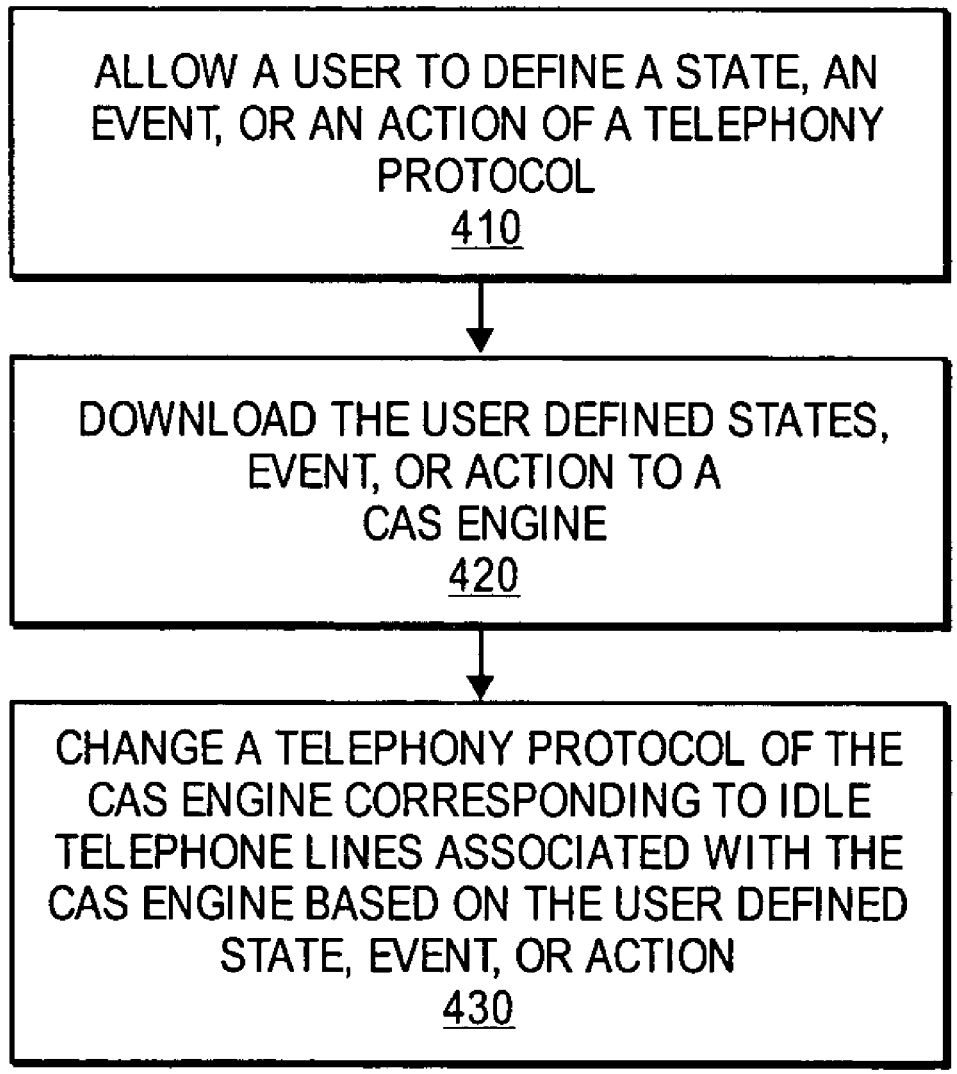
FIG. 4 shows an example of an embodiment of a method to allow a user to program the CAS module.

FIG. 4 shows an example of an embodiment of a method to allow a user to program the CAS module. The method includes allowing a user to define a state, an event, or an action of a telephony protocol, 410, downloading the user defined state, event, or action to a channel associated signal (CAS) engine, 420, and changing a telephony protocol of the CAS engine corresponding to idle telephone lines associated with the CAS engine based on the downloaded user defined state, event, or action, 430. The telephony protocol may be a CAS protocol. The state is a transient condition of the CAS engine, such as "idle," or "originate an outgoing call," for example. The event is an external trigger received by the CAS engine, such as "receive off-hook," or "receive digits," for example. The action is a response by the CAS engine to a state-event condition, such as "given a certain state and a certain event, perform this action." The action may be "initiate transmitter," or "notify call agent," for example. The method of FIG. 4 may be performed by a processing system that reads computer instructions from memory. The computer instructions, when executed by the system, may cause the system to perform the method of FIG. 4. The method of FIG. 4 may also be performed by logic devices, such as programmable logic devices, configured to implement the method to allow the user to program the CAS module.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

What is claimed is:

1. A residential gateway to receive channel associated signals (CAS) from a PBX switch, the residential gateway comprising:
 a call control device to communicate with a call agent using gateway control protocol signals;
 a management module; and
 a CAS module coupled to the call control device, the management module, and the PBX switch, the CAS module
  to receive a table from the management module, the table including a plurality of entries, each of the plurality of entries including a first line signaling state, a second line signaling state, a first time duration, and an event,
  to receive the channel associated signals from the PBX switch,
  to recognize a change of line signaling state from a former state to a new state,
  to find a first entry in the table where the former state is the same as the first line signaling state and the new state is the same as the second line signaling state,
  to set a timer for the first time duration of the first entry, and
  to send an indication of the event of the first entry to the call agent through the call control device if the timer expires before the CAS module recognizes a further change of line signaling state.

2. The residential gateway of claim 1, wherein:
 each of the plurality of entries further includes a second time duration; and
 if the CAS module recognizes a further change of line signaling state returning to the former state before the timer expires, the CAS module is further
  to find a second entry in the table where the former state is the same as the first line signaling state, the new state is the same as the second line signaling state, and a time measured by the timer is greater than the first time duration and less than the second time duration, and
  to send an indication of the event of the second entry to the call agent through the call control device.

3. The residential gateway of claim 1, wherein the management module is to receive entries for the table by download from a user.

4. The residential gateway of claim 3, wherein the CAS module is further to receive the downloaded entries for the table when an associated signaling state is an idle state.

5. The residential gateway of claim 3, wherein the management module is to receive the entries for the table as a binary file, and the residential gateway further comprises a parser program to parse the binary file and create the table.

6. The residential gateway of claim 1, wherein the table defines a telephony protocol.

7. A method for receiving channel associated signals (CAS) from a PBX switch, the method comprising:
 receiving a table including a plurality of entries, each of the plurality of entries including a first line signaling state, a second line signaling state, a time duration, and an event;
 recognizing a change of line signaling state in the channel associated signals from a former state to a new state;
 finding an entry in the table where the former state is the same as the first line signaling state and the new state is the same as the second line signaling state;
 setting a timer for the time duration of the entry; and
 sending an indication of the event to a call agent through a call control device if the timer expires before a further change of line signaling state is recognized.

8. The method of claim 7, wherein:
 each of the plurality of entries further includes a second time duration; and
 the method further comprises:
  finding a second entry in the table where the former state is the same as the first line signaling state, the new state is the same as the second line signaling state, and a time measured by the timer is greater than the first time duration and less than the second time durationl, if a further change of line signaling state returning to the former state is recognized before the timer expires, and
  sending an indication of the event of the second entry to the call agent through the call control device.

9. The method of claim 7, further comprising downloading entries for the table from a user.

10. The method of claim 9, further comprising receiving the downloaded entries for the table when an associated signaling state is an idle state.

11. The method of claim 9, wherein downloading entries for the table further comprises downloading the entries for the table as a binary file, and the method further comprises parsing the binary file to create the table.

12. An apparatus comprising:
 means for receiving a table including a plurality of entries, each of the plurality of entries including a first line signaling state, a second line signaling state, a time duration, and an event;
 means for recognizing a change of line signaling state in channel associated signals from a former state to a new state;
 means for finding an entry in the table where the former state is the same as the first line signaling state and the new state is the same as the second line signaling state;
 means for setting a timer for the time duration of the entry; and
 means for sending an indication of the event to a call agent through a call control device if the timer expires before a further change of line signaling state is recognized.

13. The apparatus of claim 12, wherein:
 each of the plurality of entries further includes a second time duration; and
 the apparatus further comprises:
  means for finding a second entry in the table where the former state is the same as the first line signaling state, the new state is the same as the second line signaling state, and a time measured by the timer is greater than the first time duration and less than the second time duration, if a further change of line signaling state returning to the former state is recognized before the timer expires, and
  means for sending an indication of the event of the second entry to the call agent through the call control device.

14. The apparatus of claim 12, further comprising means for downloading entries for the table from a user.

15. The apparatus of claim 14, further comprising means for receiving the downloaded entries for the table when an associated signaling state is an idle state.

16. The apparatus of claim 14, wherein the means for downloading entries for the table further comprises means for downloading the entries for the table as a binary file, and the apparatus further comprises means for parsing the binary file to create the table.

17. A computer readable memory having computer instructions embodied thereon, which, when executed by a computer processing system, causes the computer processing system to perform a method comprising:
    receiving a table from a user including a plurality of entries, each of the plurality of entries including a first line signaling state, a second line signaling state, a time duration, and an event of a first telephony protocol;
    downloading the table to a channel associated signal (CAS) engine; and
    changing a second telephony protocol of the CAS engine corresponding to idle telephone lines associated with the CAS engine based on the downloaded table by further
        recognizing a change of line signaling state in channel associated signals from a former state to a new state;
        finding an entry in the table where the former state is the same as the first line signaling state and the new state is the same as the second line signaling state;
        setting a timer for the time duration of the entry; and
        sending an indication of the event to a call agent through a call control device if the timer expires before a further change of line signaling state is recognized.

18. The computer readable memory of claim 17, wherein:
    each of the plurality of entries further includes a second time duration; and
    changing the second telephony protocol further comprises:
        finding a second entry in the table where the former state is the same as the first line signaling state, the new state is the same as the second line signaling state, and a time measured by the timer is greater than the first time duration and less than the second time duration, if a further change of line signaling state returning to the former state is recognized before the timer expires, and
        sending an indication of the event of the second entry to the call agent through the call control device.

19. The computer readable memory of claim 17, wherein the method further comprises receiving the downloaded entries for the table when an associated signaling state is an idle state.

20. The computer readable memory of claim 17, wherein downloading entries for the table further comprises downloading the entries for the table as a binary file, and the method further comprises parsing the binary file to create the table.

* * * * *